United States Patent Office 3,428,685
Patented Feb. 18, 1969

3,428,685
PRODUCTION OF DIALLYLAMINE
Albert B. Hall, Walnut Creek, Calif., assignor to Shell Oil Company, New York, N.Y., a corporation of Delaware
No Drawing. Filed Aug. 1, 1966, Ser. No. 569,068
U.S. Cl. 260—585          2 Claims
Int. Cl. C07c 85/02

This invention relates to an improved process for the production of diallylamine.

PRIOR ART

Diallylamine is an important chemical of commerce, and is readily prepared, together with triallylamine, by the reaction of an allyl halide, such as allyl chloride and ammonia. When manufacturing diallylamine from allyl chloride and ammonia, however, undesirably large amounts of triallylamine are formed, and it is desirable to convert these to diallylamine. Various physical and chemical methods have been investigated for performing this conversion. G. A. Boswell, U.S. Patent 3,110,731, Nov. 12, 1963, discloses the conversion of triallylamine to diallylamine by isomerization of triallylamine in contact with a solid metal hydrogenation catalyst, e.g. palladium, producing diallylpropenylamine, which upon hydrolysis is converted to diallylamine and propionaldehyde. The cost of the metal catalyst is such that any reduction in cost of the conversion would improve the commercial attractiveness thereof. Another method comprises vapor phase reversion, i.e. pyrolysis, of triallylamine to diallylamine. This method is too inefficient to be of commercial interest. C. Ainsworth and N. R. Easton, J. Org. Chem. 27, 4118 (1962) disclose that, although the hydrochloride salts of saturated aliphatic tertiary amines undergo thermal fragmentation to give various amine cleavage products, 1,1-dimethylallylamine hydrochloride heated at 260° C. decomposes to give isoprene and ammonium chloride.

THE INVENTION

It has now been found that increased yields of diallylamine are obtained in the reaction of allyl chloride with ammonia by converting the triallylamine formed as by-product to its hydrochloride salt, pyrolyzing this salt at about 180° to about 280° C. to form (a) diallylamine, which is recovered, (b) allyl chloride, which is recycled to the amine formation stage, and (c) triallylamine, which is reconverted to the hydrochloride and recycled to the pyrolysis stage.

REACTANT

The conversion of triallylamine to its hydrochloride salt is conveniently accomplished by mixing aqueous HCl with triallylamine. Anhydrous HCl may be used but is not preferred owing to its comparatively high cost. In the aqueous preparation, the water may be removed by distillation and the residual hydrochloride salt, i.e. triallylamine hydrochloride, recovered. To effect economy the triallylamine hydrochloride need not be separated and the pyrolytic step may be continued with further continuous heating upon the removal of the water.

REACTION CONDITIONS

The production of diallylamine from the triallylamine is accomplished by pyrolysis of the hydrochloride salt of triallylamine at a temperature of from about 180° to about 280° C., preferably from about 180° to about 220° C. The reaction may be conducted in any suitable apparatus that is conventionally employed for heating and distilling corrosive materials, for example glass or Hastalloy B pyrolysis vessels. Resulting from the pyrolysis are overhead by-products, allyl chloride and triallylamine, which can be separated by simple distillation. The allyl chloride is then recycled to the amine formation step, i.e. the initial reaction of allyl chloride with ammonia, which reaction generally is carried out in liquid phase in a tube reactor at about 75° to about 80° C., a pressure of about 700 to about 800 p.s.i.g., and an ammonia/allyl chloride molar ratio of about 10/1 to about 15/1. The triallylamine is reconverted to its hydrochloride and recycled to the aforedescribed pyrolysis. The bottoms product from the pyrolysis is diallylamine hydrochloride, together with a small amount of unreacted triallylamine hydrochloride. The diallylamine is recovered from the reaction system by conventional methods, such as neutralization followed by fractional distillation, selective extraction, crystallization or any combination thereof.

Another convenient method for recovering diallylamine from the bottoms product comprises neutralization of the mixture in the pyrolysis vessel followed by steam stripping the amines overhead.

A reduction in yield of diallylamine may result from formation of a minor amount of tetraallylammonium chloride from reaction of triallylamine with allyl chloride in the pyrolysis vessel. Since aqueous conditions favor this reaction, it is preferred to include a water flash prior to the pyrolysis so as to ensure a substantially anhydrous mixture in order to minimize quaternary salt formation.

A minor amount of monoallylamine is usually obtained from the pyrolysis of some of the diallylamine produced. This is no obstacle to the efficacy of the process for this monoallylamine is easily separable from the polyallylamines and is then recycled to the initial amine formation step where it is reconverted to polyallylamine.

The process may be conducted in a batch, semibatch or continuous manner, with recycle of unconverted starting material and by-product intermediates, achieving the desired over-all efficiency.

REACTION MECHANISM

It is believed that the first step of the pyrolysis is a nucleophilic attack by the chlorine ion on an allyl group to yield diallylamine and allyl chloride:

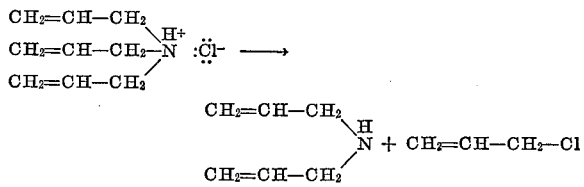

Diallylamine, being more basic than triallylamine, then attacks a molecule of triallylamine hydrochloride to liberate triallylamine and form the desired diallylamine hydrochloride salt:

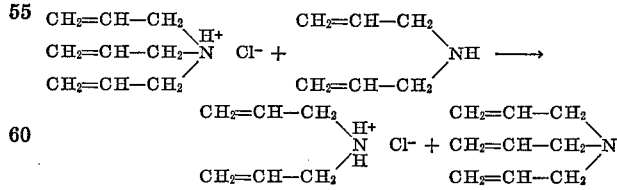

Consequently, conversion of the triallylamine hydrochloride to diallylamine can never be greater than 50% if no excess HCl is present. Hence, molar ratios of HCl/triallylamine of greater than one are preferred.

EXAMPLE 1

59.1 grams of 37% HCl (0.6 mol) was slowly added to 67.4 g. (0.49 mol) of triallylamine (separated from the reaction mixture obtained in the production of diallylamine by reaction of allyl chloride with ammonia in liquid phase in a tube reactor at 80° C., a pressure of 750 p.s.i.g., and an ammonia/allyl chloride molar ratio of about 12/1) at ice-water temperature with stirring to produce 126.5 g. of aqueous triallylamine hydrochloride. This mixture was charged to a 250 ml. flask equipped with a short fractionation column. Heat was applied slowly and water was removed as a forecut. At about 180° C. pyrolysis began as indicated by evolution of allyl chloride and triallylamine condensed as a two-phase overhead product. Pyrolysis was continued to 240° C. Analyses indicated results given in Table I.

TABLE I

| | |
|---|---|
| Mols HCl/mols triallylamine | 1.2/1 |
| Temperature, ° C. | 240 |
| Products, percent w.: | |
| Allyl chloride | 21.3 |
| Monoallylamine | 1.5 |
| Diallylamine | 21.4 |
| Triallylamine | 47.0 |
| Heavy ends | 8.8 |
| Light ends | — |
| Conversion, percent m. | 49.5 |

EXAMPLES 2–4

In continuously conducted processing, 37% HCl was reacted with triallylamine to produce an aqueous triallylamine hydrochloride mixture which was fed continuously to a pyrolysis reactor maintained at 220–230° C. and equipped with a vapor and bottoms drawoff. The condensed tops product was phase separated into an aqueous and an organic phase, the organic phase containing triallylamine and allyl chloride. Results are summarized in Table II.

TABLE II

| Example | 2 | 3 | 4 |
|---|---|---|---|
| Mols HCl/mols Triallylamine | 1.1/1 | 1.1/1 | 2.5/1 |
| Residence Time, min | 51 | 62 | 128 |
| Triallylamine conversion, percent m | 36.5 | 47.1 | 69.2 |
| Products, percent w.: | | | |
| Allyl chloride | 22.4 | 20.5 | 25.0 |
| Monoallylamine | 3.8 | 5.9 | 5.8 |
| Diallylamine | 16.4 | 13.7 | 17.0 |
| Triallylamine | 52.9 | 44.2 | 27.2 |
| Heavy Ends | 3.7 | 14.8 | 25.0 |
| Light Ends | 0.8 | 0.9 | — |

EXAMPLES 5–7

A feed of aqueous triallylamine hydrochloride was metered continuously to the pyrolysis vessel at a rate selected to give the proper residence time. The overhead from the pyrolysis vessel, consisting of triallylamine, allyl chloride, and water, was condensed, and the two-phase system separated for analysis. The upper overhead layer consisted of triallylamine and allyl chloride, and the lower phase of water, with traces of dissolved amines. At the end of the run the product in the pyrolysis vessel was neutralized, and the resulting amines were steam-stripped overhead. The pyrolysis temperature was 220° C. and the molar ratio of HCl/triallylamine was 1.1/1 in each run. The results are summarized in Table III.

TABLE III

| Example | 5 | 6 | 7 |
|---|---|---|---|
| Residence Time, min | 124 | 58 | 37 |
| Triallylamine Conversion, percent m | 63.1 | 53.8 | 45.9 |
| Products, percent w.: | | | |
| Allyl chloride | 20.3 | 21.7 | 22.5 |
| Monoallylamine | 2.5 | 1.8 | 2.5 |
| Diallylamine | 14.2 | 15.7 | 16.8 |
| Triallylamine | 41.2 | 46.4 | 53.1 |
| Heavy Ends | 15.9 | 10.4 | 1.6 |
| Light Ends | 0.5 | 0.3 | 0.6 |

I claim as my invention:

1. In the process of producing diallylamine by the reaction of allyl chloride with ammonia, the improvement of separating and converting the triallylamine formed as by-product to its hydrochloride salt, pyrolyzing the hydrochloride salt at about 180° to about 280° C. to form (a) diallylamine, which is recovered, (b) allyl chloride, which is recycled for reaction with ammonia, and (c) triallylamine, which is reconverted to the hydrochloride and recycled to the pyrolysis stage.

2. The process according to claim 1 wherein the pyrolysis is conducted at a temperature of from about 180° to about 220° C.

References Cited

UNITED STATES PATENTS 2,216,548  10/1940  Converse.

CHARLES B. PARKER, *Primary Examiner.*

R. L. RAYMOND, *Assistant Examiner.*

U.S. Cl. X.R.

260—583